(12) United States Patent
Nagao

(10) Patent No.: US 8,358,472 B2
(45) Date of Patent: Jan. 22, 2013

(54) LENS BARREL AND OPTICAL APPARATUS INCLUDING THE SAME

(75) Inventor: Yuki Nagao, Utsunomiya (JP)

(73) Assignee: Canon Kabushiki Kaisha (JP)

(*) Notice: Subject to any disclaimer, the term of this patent is extended or adjusted under 35 U.S.C. 154(b) by 0 days.

(21) Appl. No.: 13/197,053

(22) Filed: Aug. 3, 2011

(65) Prior Publication Data

US 2012/0033310 A1 Feb. 9, 2012

(30) Foreign Application Priority Data

Aug. 4, 2010 (JP) ................................. 2010-175453
Jun. 20, 2011 (JP) ................................. 2011-136535

(51) Int. Cl.
*G02B 15/14* (2006.01)
*G02B 7/02* (2006.01)

(52) U.S. Cl. ......................... 359/700; 359/704; 359/819

(58) Field of Classification Search .......... 359/694–704, 359/811–830
See application file for complete search history.

(56) References Cited

U.S. PATENT DOCUMENTS

| 6,995,927 | B2* | 2/2006 | Onda ............................. 359/699 |
| 7,019,916 | B2* | 3/2006 | Suzuki .......................... 359/699 |
| 2003/0081325 | A1* | 5/2003 | Nomura et al. ............... 359/700 |

FOREIGN PATENT DOCUMENTS

JP 10227964 A 8/1998

* cited by examiner

*Primary Examiner* — Mohammed Hasan
(74) *Attorney, Agent, or Firm* — Rossi, Kimms & McDowell LLP

(57) ABSTRACT

A lens barrel includes: a frame for holding an optical lens, the frame having a bottomed circular recess formed in its outer peripheral surface; a cam follower fixed to an outer diameter portion of the frame with screws, the cam follower including a core and a collar provided on an outer periphery of the core; and a barrel member having a guide groove into which the cam follower is fitted, the guide groove determining a position of the frame, in which under a state in which the cam follower is mounted to the outer diameter portion of the frame, an outer diameter portion of the collar is fitted to an inner diameter portion of the circular recess, and one end surface of the core abuts on a bottom surface of the circular recess and another end surface of the core abuts on a head of the screw.

9 Claims, 3 Drawing Sheets

LENS BARREL AND OPTICAL APPARATUS INCLUDING THE SAME

BACKGROUND OF THE INVENTION

1. Field of the Invention

The present invention relates to a lens barrel and an optical apparatus including the same, which are suitably used for a digital camera, a video camera, or the like and are capable of holding stably, even under external impact or environmental change, a lens holding member that holds, for example, a lens unit and moves in an optical axis direction.

2. Description of the Related Art

In a lens barrel used for an optical apparatus such as a digital camera or a video camera, at the time of focusing and zooming, a lens holding member that holds a lens unit is moved in an optical axis direction by rotation of a rotation barrel.

In a drive mechanism for the lens barrel including the lens holding member that moves in the optical axis direction, there are used a cam barrel having a cam groove formed therein, a guide barrel (fixed member) having a longitudinal groove (translation groove) formed therein parallel to the optical axis direction, and a cam follower to be fitted into both the grooves. The cam follower is fixed to the lens holding member with a screw or the like. Further, the lens holding member supporting the cam follower is driven in the optical axis direction by the cam follower that is engaged with the cam groove of the cam barrel and the longitudinal groove of the guide barrel by rotation of the cam barrel about an optical axis.

At this time, in order to move the lens holding member along a cam locus with high accuracy, it is important to stably fix the cam follower at a fixed position of the lens holding member without shift. It is desired that, under a condition that the cam follower is mounted to the lens holding member with high accuracy, assembly be performed so that a diameter dimension of the cam follower is equal to a width dimension of the cam groove formed in the cam barrel and a width dimension of the longitudinal groove formed in the guide barrel, or the diameter dimension of the cam follower is slightly larger than the width dimensions of the cam groove and the longitudinal groove.

In addition, there is desired a holding mechanism for the lens holding member, which prevents a change in initial lens holding state as much as possible even under environmental change such as external temperature or under application of impact.

In this context, Japanese Patent Application Laid-Open No. H10-227964 discloses the following lens barrel. Specifically, the lens barrel uses the cam follower that has impact resistance and is held so as to be slidable in the cam groove of the cam barrel and the longitudinal groove of the guide barrel, and the lens barrel moves the lens holding member (moving frame). In the lens barrel disclosed in Japanese Patent Application Laid-Open No. H10-227964, the cam follower includes the collar member made of a synthetic resin, and the metallic intermediate member including the flange portion. Further, the initial lens holding state can be maintained stably for a long period of time while friction load at the time of sliding is suppressed. In the lens barrel disclosed in Japanese Patent Application Laid-Open No. H10-227964, the cam follower (coupling member) includes the collar member and the intermediate member including the flange portion. Further, the flange portion that abuts on the lens holding frame at the time of screw fastening is provided on the intermediate member side, thereby increasing stability of a screw fastening work and a resistance force to impact.

However, regarding the lens barrel disclosed in Japanese Patent Application Laid-Open No. H10-227964, how to position the cam follower with respect to the cam follower lens holding frame when fixing the cam follower to the lens holding frame (moving frame) is not specifically disclosed. If the cam follower is not assembled to the lens holding frame with high accuracy, it is difficult to maintain and move the lens holding frame with high accuracy.

SUMMARY OF THE INVENTION

A lens barrel according to the present invention includes: a lens holding frame for holding an optical lens, the lens holding frame having a bottomed circular recess formed in its outer peripheral surface; a cam follower fixed to an outer diameter portion of the lens holding frame with a screw, the cam follower including a core portion and a collar portion provided on an outer periphery of the core portion; and a barrel member having a guide groove into which the cam follower is fitted, the guide groove determining a position of the lens holding frame, in which under a state in which the cam follower is mounted to the outer diameter portion of the lens holding frame, an outer diameter portion of the collar portion is fitted to an inner diameter portion of the bottomed circular recess, and one end surface of the core portion abuts on a bottom surface of the bottomed circular recess and another end surface of the core portion abuts on a head portion of the screw.

Further features of the present invention will become apparent from the following description of exemplary embodiments with reference to the attached drawings.

DESCRIPTION OF THE EMBODIMENT

Figure 1:
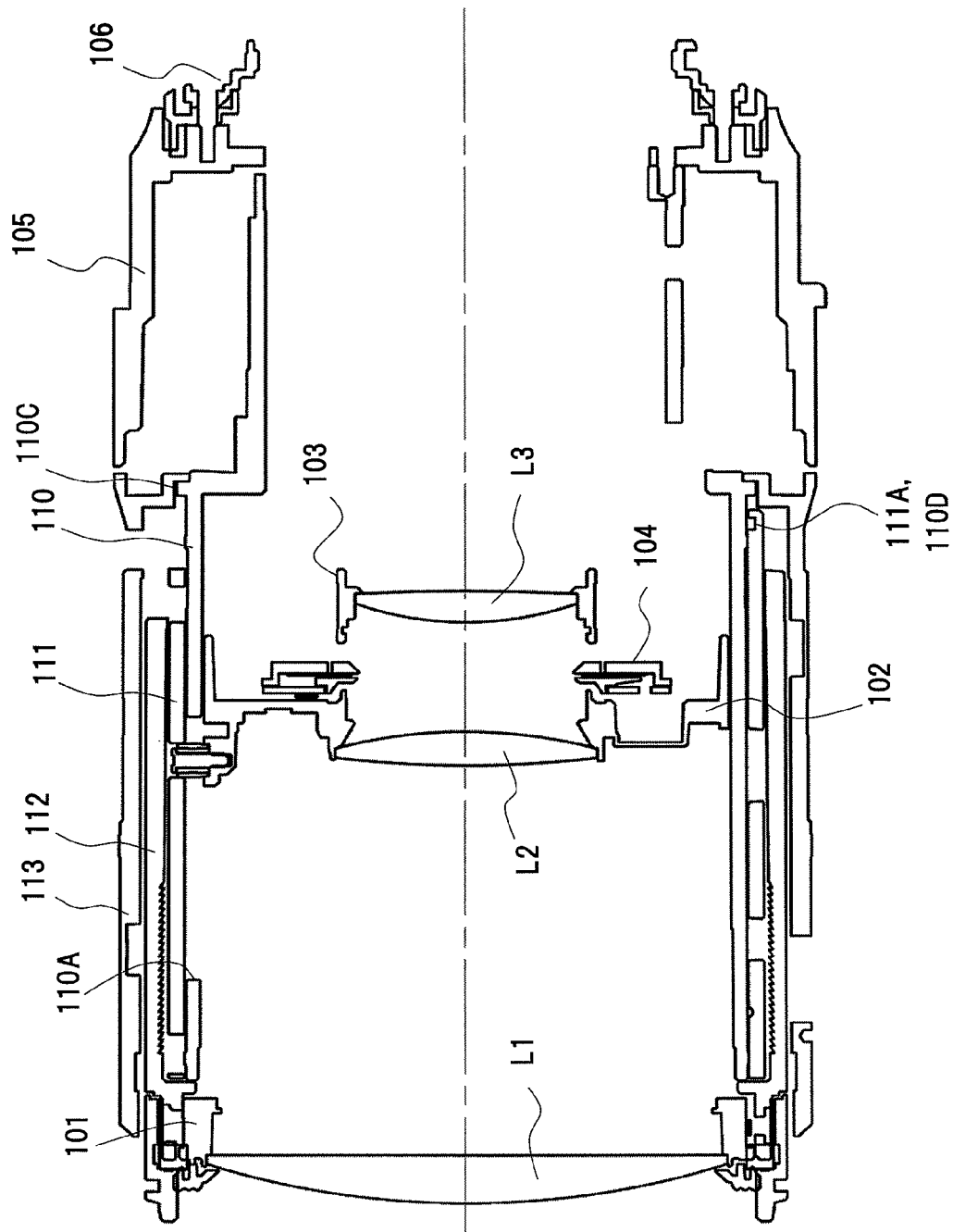
FIG. 1 is a cross-sectional view of a main part of an interchangeable lens according to an embodiment of the present invention.

In the following, an embodiment of the present invention is described with reference to the accompanying drawings.

A lens barrel according to the present invention includes a lens holding frame (second lens barrel) 102 that holds an optical lens (second lens unit) L2 and includes an outer diameter portion to which a cam follower (skid portion) 114 is fixed. In addition, the lens barrel includes a first barrel member (guide barrel) 110 having a second translation groove portion 110B formed therein and a second barrel member (cam barrel) 111 having a second cam groove portion 111C formed therein, the first barrel member and the second barrel member being fitted to each other on their inner and outer peripheries to be held so as to be relatively rotatable about an optical axis.

The cam follower 114 provided to the lens holding frame 102 is fitted into an intersecting portion of both the groove portions (110B, 111C) all at once, which are formed in the first and second barrel members 110, 111, respectively. One of the barrel members, i.e., the barrel member (cam barrel)

111 is driven to rotate so that the lens holding frame 102 moves in an optical axis direction. The cam follower 114 includes a core portion 114A made of a metal material and a collar portion 114B made of a resin material, the collar portion 114B covering an outer periphery of the core portion and having an axial size smaller than that of the core portion 114A. In an axial direction, end surfaces 114A-4, 114A-5 of the core portion 114A of the cam follower 114 protrude from end surfaces 114B-2, 114B-4 of the collar portion 114B. Large diameter portions 114A-1, 114A-2 of the core portion 114A of the cam follower 114, which are provided on both axial sides, have the same diameter. Further, in a center portion in the axial direction of the core portion 114A, there is provided a small diameter portion 114A-3 for preventing the core portion 114A and the collar portion 114B from slipping off in the axial direction and eliminating a directivity in the axial direction of the core portion 114A. In other words, the cam follower 114 shows the same shape when viewed from any directions. Further, a radial thickness W of the collar portion 114B is smaller than a radial thickness V of the core portion 114A. A bottomed circular recess 102D is formed in an outer peripheral surface of the lens holding frame 102, and the circular recess 102D includes an inner diameter portion (seat-surface inner diameter portion) 102B to which an outer diameter portion (first diameter portion) 114B-3 of the collar portion 114B of the cam follower 114 is fitted. Under a state in which the cam follower 114 is fixed to the outer diameter portion of the lens holding frame 102, the outer diameter portion 114B-3 of the collar portion 114B of the cam follower 114 is fitted to the inner diameter portion 102B of the circular recess 102D of the lens holding frame 102. At this time, the end surface 114B-2 of the collar portion 114B does not abut on a bottom surface 102A of the circular recess 102D, whereas the end surface 114A-5 of the core portion 114A abuts on the bottom surface (seat surface) 102A of the circular recess 102D. In the following, with reference to FIG. 1 and FIG. 2, the structure of the lens barrel according to the embodiment of the present invention is described.

Figure 2:
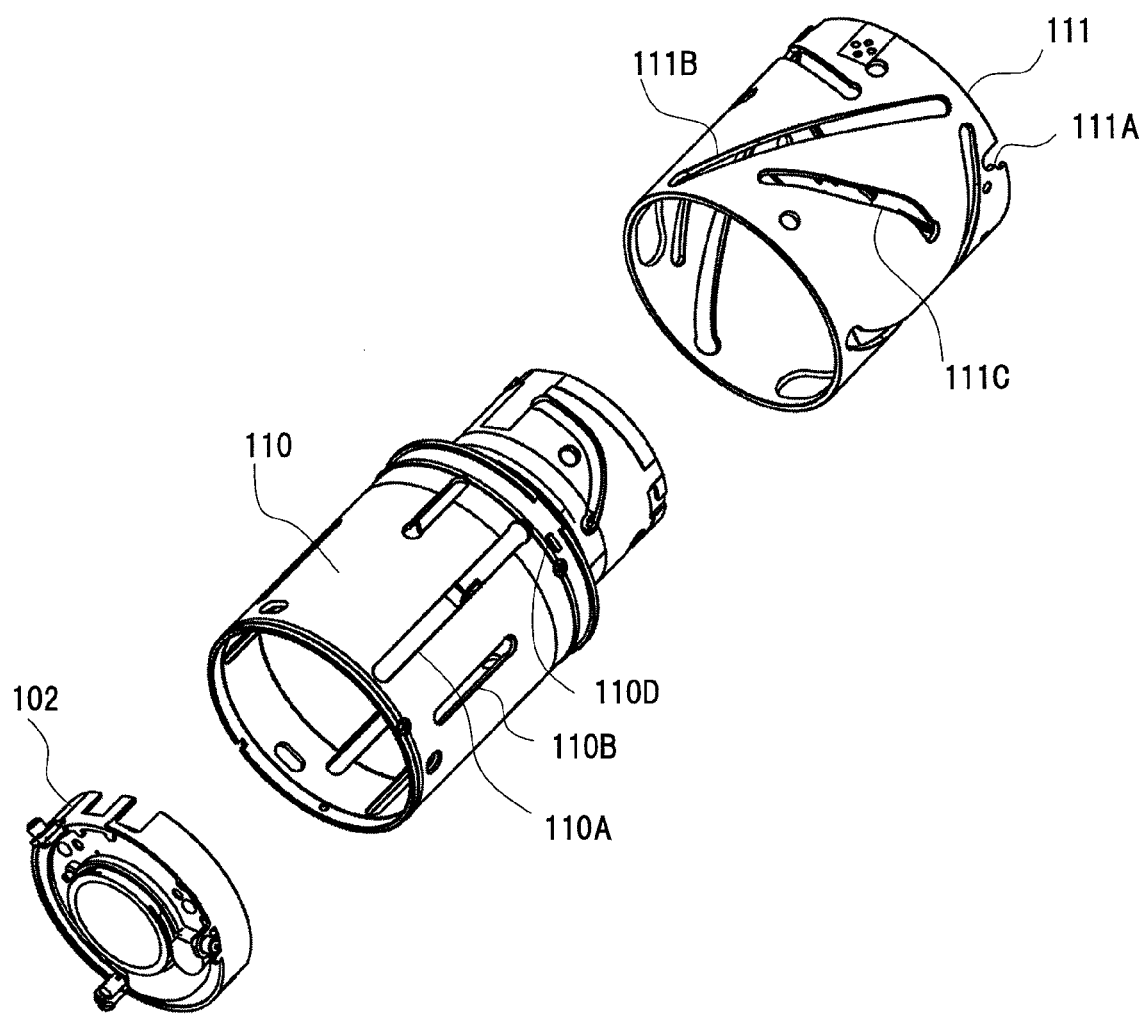
FIG. 2 is an exploded perspective view of a main part of the interchangeable lens according to the embodiment of the present invention.
Figure 3:
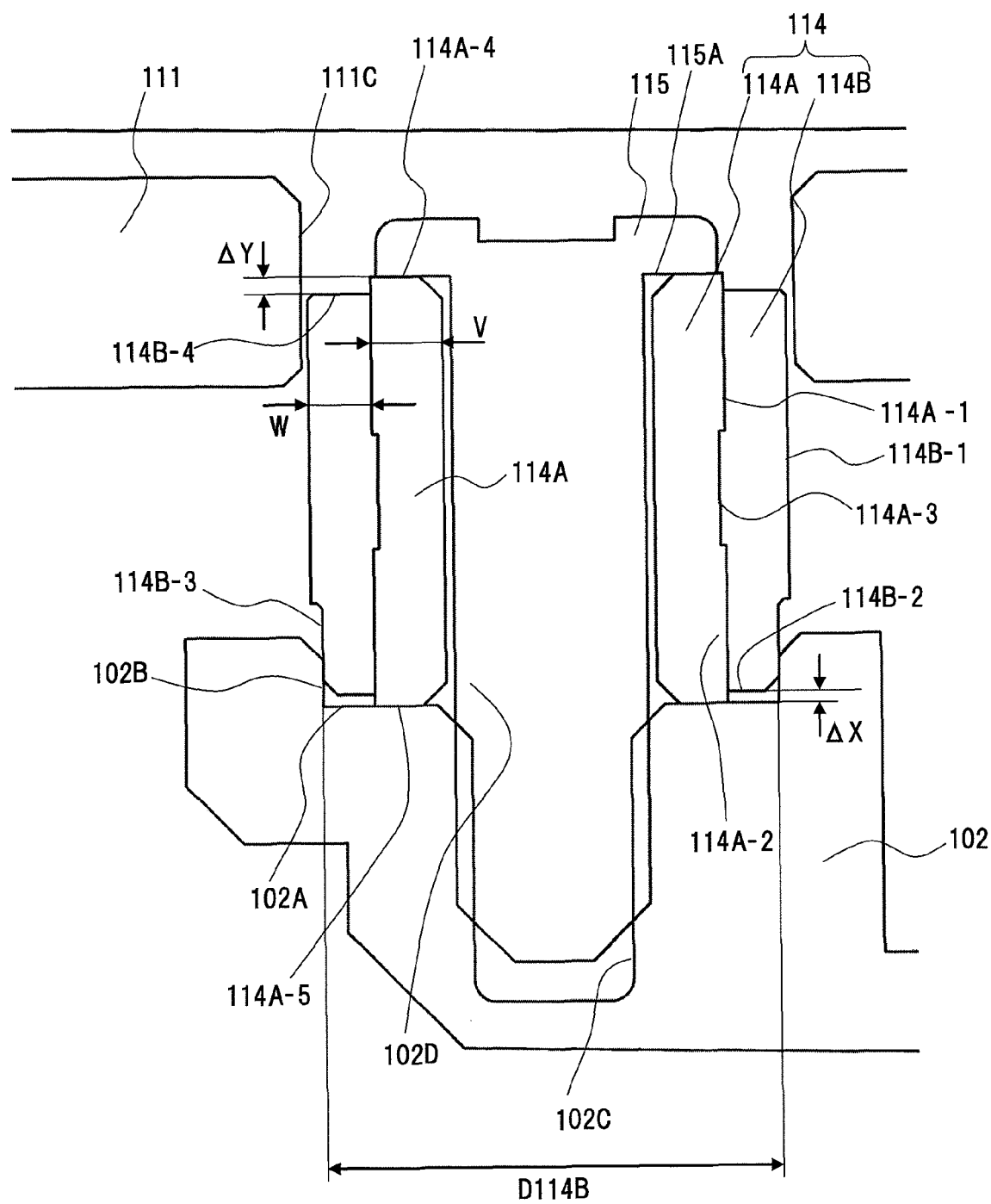
FIG. 3 is an enlarged view illustrating fixing of a cam follower of the interchangeable lens according to the embodiment of the present invention.

FIG. 1 is a cross-sectional view of a main part of an interchangeable lens (lens barrel) 100 according to the embodiment of the present invention. FIG. 2 is a perspective view of a main part of the interchangeable lens 100. FIG. 3 is an enlarged explanatory diagram of a part of FIG. 1.

The interchangeable lens 100 includes a zoom lens system having the structure formed of three units, i.e., a first lens unit L1, a second lens unit L2 and a third lens unit L3 provided in the stated order from an object side (left side of the drawing sheet). The first lens unit L1 and the second lens unit L2 are lens units for varying magnification, which move in the optical axis direction through a zooming operation of a zoom operation ring 113. The third lens unit L3 is a lens unit for focusing, which advances and retreats in the optical axis direction through a focusing operation. The first lens unit L1, the second lens unit L2, and the third lens unit L3 are held by a first lens barrel 101, the second lens barrel 102, and a third lens barrel 103, respectively.

The interchangeable lens 100 includes a mount 106 for detachably mounting the interchangeable lens 100 onto a camera main body (not shown). A stop 104 is fixed to the second lens barrel 102. An outer barrel 105 is fixed onto the end surface on a camera side of the guide barrel 110. In addition, the mount 106 is fixed onto the end surface of the outer barrel 105.

The cam barrel (rotation barrel) 111 is arranged outside the guide barrel 110. The cam barrel 111 is arranged on the outer periphery of the guide barrel 110 so as to be rotatable. At a recessed groove 111A provided in the cam barrel 111, the cam barrel 111 is coupled in a bayonet fashion to a protrusion 110D provided on the guide barrel 110. With this structure, the cam barrel 111 can only rotate about the optical axis (hereinafter referred to as rotation at a fixed position) without moving relative to the guide barrel 110 in the optical axis direction.

In the cam barrel 111, a first cam groove portion 111B and the second cam groove portion 111C are formed. The first cam groove portion 111B and the second cam groove portion 111C are formed for moving the first lens barrel 101 and the second lens barrel 102 in the optical axis direction at the time of the zooming operation of the zoom operation ring 113. Outside the cam barrel 111, there is arranged a translating lens barrel 112 that holds the first lens barrel 101 and moves linearly and integrally with the first lens barrel 101 in the optical axis direction. In addition, the zoom operation ring 113 is arranged on the outer periphery of the translating lens barrel 112 so as to be rotatable at a fixed position.

To the translating lens barrel 112, a cam follower (not shown) is fixed with a screw, and the cam follower is fitted into the first cam groove portion 111B formed in the cam barrel 111 and into a first translation groove portion 110A formed in the guide barrel 110 to extend in the optical axis direction.

The zoom operation ring 113 has a recessed groove (not shown) formed therein in a circumferential direction, and is coupled to a protrusion 110C of the guide barrel 110 in a bayonet fashion. With this structure, the zoom operation ring 113 does not move relative to the guide barrel 110 in the optical axis direction (that is, stays at a fixed position in the optical axis direction), but can rotate about the optical axis at a fixed position. A rotation transmission key (not shown) is mounted to the zoom operation ring 113. The rotation transmission key is engaged with a groove portion (not shown) of the cam barrel 111 to transmit rotation of the zoom operation ring 113 to the cam barrel 111.

To the second lens barrel 102, the cam follower 114 is fixed with a screw 115. The cam follower is fitted into the second cam groove portion 111C formed in the cam barrel 111 and into the second translation groove portion 110B formed in the guide barrel 110 to extend in the optical axis direction.

A cam follower is fixed onto the outer periphery of the third lens barrel 103 with a screw. The cam follower is engaged with a focus cam groove (not shown) and a translation groove formed in a focus rotation barrel (not shown).

The focus rotation barrel is connected to an output shaft of a focus drive motor (not shown), and the third lens barrel 103 is driven by rotation of the focus drive motor.

Operations of the zoom lens barrel structured as described above are described. First, when the zoom operation ring 113 is operated to rotate, a rotational force is transmitted to the cam barrel 111 through the rotation transmission key of the zoom operation ring 113 and the groove portion of the cam barrel 111, and then the cam barrel 111 rotates about the optical axis at a fixed position. When the cam barrel 111 rotates, the translating lens barrel 112 and the second lens barrel 102 are driven to linearly move in the optical axis direction, the translating lens barrel 112 having the cam follower that is engaged with the first cam groove portion 111B formed in the cam barrel 111 and with the first translation groove portion 110A formed in the guide barrel 110, the second lens barrel 102 having the cam follower that is engaged with the second cam groove portion 111C formed in the cam barrel 111 and with the second translation groove portion 110B formed in the guide barrel 110. With this structure, zooming (changing of a focal length) of the zoom lens system held by the interchangeable lens 100 is performed.

Next, the shape of the cam follower (skid member) 114 fixed to the second lens barrel 102 in the interchangeable lens 100 according to the present invention is described.

FIG. 3 is a detailed view of the cam follower 114 mounted to the second lens barrel 102 for holding the second lens unit L2.

The cam follower 114 is formed in such a manner that the collar member (collar portion) 114B made of a resin material is insert-molded to the outer periphery of the core portion (metal core) 114A formed of a metal component (metal material). An outer diameter of the core portion 114A is formed by the large diameter portions 114A-1, 114A-2 and the small diameter portion 114A-3 having a diameter slightly smaller than those of the large diameter portions. The small diameter portion 114A-3 functions so as to prevent the core portion 114A and the collar portion 114B to be inserted from slipping off in the axial direction. The bottomed circular recess 102D is formed in the outer peripheral surface of the lens barrel 102. The cam follower 114 includes the first diameter portion 114B-3 that is fitted to the seat-surface inner diameter portion (inner diameter portion) 102B of the circular recess 102D of the second lens barrel 102. In addition, the cam follower 114 includes a second diameter portion 114B-1 that slides in the longitudinal groove 110B of the guide barrel 110 (FIG. 2) and the cam groove 111C of the cam barrel 111 (FIG. 2).

Further, in the axial direction of the cam follower 114, only the end surface 114A-5 of the core portion 114A abuts on the seat surface 102A of the circular recess 102D of the lens barrel 102. Specifically, a position of the end surface 114A-5 of the core portion 114A is shifted by an amount of ΔX from a position of the end surface 114B-2 of the collar portion 114B. It is desired that a value of ΔX be set to about from 0 mm to 0.1 mm. This is because, when the value of ΔX is set too large, a fitting length of the first diameter portion 114B-3 of the cam follower with respect to the seat-surface inner diameter portion (inner diameter portion) 102B of the circular recess 102D is set small.

Further, similarly, a position of the end surface 114A-4 of the core portion 114A, which is opposite to the end surface 114A-5 in the axial direction, is shifted by an amount of ΔY from a position of the end surface 114B-4 of the collar portion 114B. It is desired that a value of ΔY be set to about from 0 mm to 0.1 mm. This is because, when the value of ΔY is set too large, a contact surface between the cam groove 111C and the second diameter portion 114B-1 of the cam follower is reduced.

Further, an outer diameter D114B of the first diameter portion 114B-3 of the collar portion 114B of the cam follower 114 is set to be slightly larger than a diameter of the seat-surface inner diameter portion 102B of the lens barrel 102.

Thus, the cam follower 114 is fitted to the seat-surface inner diameter portion 102B of the lens barrel 102 under a slight press-fit relation, thereby enabling assembly without backlash.

Procedures for assembling the cam follower 114 having the dimension set as described above into the lens barrel 102 are described.

First, the seat surface inner diameter portion 102B of the circular recess 102D of the lens barrel 102 and the first outer diameter portion 114B-3 of the collar portion 114B of the cam follower 114 are fitted to each other. In this manner, the cam follower 114 is positioned in a predetermined position of the lens barrel 102. In addition, when the cam follower 114 is pushed into the seat surface 102A side of the lens barrel 102, the end surface 114A-5 of the core portion 114A abuts on the seat surface 102A of the lens barrel 102. In this state, the screw 115 is inserted through a center through portion of the core portion 114A to be screwed into a screw hole 102C of the lens barrel 102.

At this time, the screw-head-side end surface 114A-4 of the core portion 114A abuts on a screw-head-side end surface 115A without pressing the collar portion 114B. In this manner, a force due to screw fastening is transmitted from the screw-head-side end surface (end surface) 114A-4 of the core portion 114A to the seat surface 102A of the lens barrel 102. When the core portion 114A is made of a highly rigid material such as metal, the core portion 114A is less likely to deform even when fastened with a strong screw fastening force, and slippage of the cam follower 114 and looseness of the screw at the time of receiving impact can be prevented.

Regarding the position of the cam follower 114 with respect to the lens barrel 102, because the collar portion 114B made of a resin material is fitted and fastened to the seat-surface inner diameter portion 102B of the lens barrel 102, the cam follower 114 is positioned at a predetermined position. Thus, a special technology for assembly at a stable position is not required. Therefore, a variation and the like due to the assembly are less likely to occur. Further, it is desired that, in order to increase resistance performance to environment such as high-temperature or high-humidity environment, the collar portion 114B be thinned as much as possible as long as the collar portion 114B can be molded. For example, it is desired that the thickness be set within a range of about 0.3 mm to 0.7 mm. For example, it is preferred that the radial thickness W of the collar portion 114B be set to be equal to or smaller than the radial thickness V of the core portion 114A. For example, it is preferred that the relation $0.5V<W<0.9V$ be established. Accordingly, even when the cam follower 114 is placed under a high-temperature condition or a high-humidity condition and the collar portion 114B made of a resin is subjected to thermal creep deformation, it is easy to suppress a change in outer diameter dimension of the entire cam follower 114 as much as possible. Thus, it is possible to alleviate load of preventing an increase of backlash in a groove width direction between the second translation groove 110A of the guide barrel 110 and the cam groove 111B of the cam barrel 111.

Further, in this embodiment, the large diameter portions 114A-1, 114A-2 of the core portion 114A are set to have the same dimension, and the small diameter portion 114A-3 is provided at a center position of the axial length of the core portion 114A. This structure has an advantage that the directivity in the axial direction of the core portion 114A is eliminated. In other words, this structure assumes the same state when viewed from any directions, and hence workability at the time of manufacture is improved. Further, an area of the end surface 114A-4 that abuts on the screw-head-side end surface 115A when the cam follower 114 is fastened with the screw 115 is equal to an area of the end surface 114A-5 that abuts on the seat surface 102A of the lens barrel 102, and hence a cross-section of the core portion 114A is substantially uniform over the entire region. Thus, there is a feature that there is no point of stress concentration even when the screw fastening force or another external force is applied to the core portion 114A.

Therefore, the core portion 114A can receive the fastening force of the screw 115 and impact load in the axial direction of the cam follower 114, and the collar portion 114B and the core portion 114A can receive impact load in the radial direction of the cam follower 114. Thus, an initial position of the cam follower 114 with respect to the lens barrel 102 is determined firmly, and the core portion 114A functions, which is high in strength with respect to the load in the axial direction and the radial direction of the cam follower 114.

In this manner, it is possible to obtain the interchangeable lens having increased reliability on impact resistance and resistance to environmental change.

In this embodiment, although a resin material is not particularly designated as the material of the collar member 114B, when the collar portion 114B is made of a resin having a low coefficient of friction, such as POM, a sliding frictional force with the cam groove and the longitudinal groove can be reduced, with the result that a force of zooming operation can be reduced. Further, the cam follower 114 is formed in such a manner that the collar member 114B is insert-molded to the core portion 114A. However, regardless of whether or not insert-molding is performed, a cam follower that is produced by inserting the collar member 114B to the core portion 114A from the outer diameter can provide the same effects.

Further, in the lens barrel in which the lens holding frame is fixed to a separate member using the cam follower or the lens holding frame is guided and driven by the barrel member having the cam groove formed therein, even in a case of applying the structure other than that described in the above-mentioned embodiment, the cam follower according to the present invention is applicable. Also in that case, it is possible to obtain the same effects as those described above.

The example in which the large diameter portions 114A-1, 114A-2 and the small diameter portion 114A-3 having the diameter slightly smaller than those of the large diameter portions function so as to prevent slip-off is described. This structure may be inverted into the structure in which a portion corresponding to the small diameter portion 114A-3 has a diameter slightly larger than those of portions corresponding to the large diameter portions 114A-1, 114A-2, thereby preventing the core portion 114A and the collar portion 114B to be inserted from slipping off.

As described above, in this embodiment, the structure of the cam follower is suitably set, the cam follower being fixed to the lens holding frame and engaged with the groove portions respectively provided in both the first and second barrel members that are held so as to be relatively rotatable. With this structure, it is possible to obtain a lens barrel capable of easily achieving initial performance and increasing impact resistance performance and resistance performance to environmental change such as temperature or humidity change, and to obtain an optical apparatus including the lens barrel.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2010-175453, filed Aug. 4, 2010 and No. 2011-136535 filed Jun. 20, 2011, which are hereby incorporated by reference herein in their entirety.

What is claimed is:

1. A lens barrel, comprising:
 a lens holding frame for holding an optical lens, the lens holding frame having a bottomed circular recess formed in its outer peripheral surface;
 a cam follower fixed to an outer diameter portion of the lens holding frame with a screw, the cam follower including a core portion and a collar portion provided on an outer periphery of the core portion; and
 a barrel member having a guide groove into which the cam follower is fitted, the guide groove determining a position of the lens holding frame,
 wherein under a state in which the cam follower is mounted to the outer diameter portion of the lens holding frame, an outer diameter portion of the collar portion is fitted to an inner diameter portion of the bottomed circular recess, and one end surface of the core portion abuts on a bottom surface of the bottomed circular recess and another end surface of the core portion abuts on a head portion of the screw.

2. A lens barrel according to claim 1, wherein the collar portion is made of a resin material, and the core portion is made of a metal material.

3. A lens barrel according to claim 1, wherein the one end surface and the another end surface of the core portion are flush with or protrude from end surfaces of the collar portion in an axial direction.

4. A lens barrel according to claim 1,
 wherein the core portion comprises a small diameter portion provided at a center portion in an axial direction of the core portion, for preventing the core portion and the collar portion from slipping off in the axial direction, and
 wherein the core portion comprises first and second large diameter portions provided on both sides of the small diameter portion in the axial direction of the core portion, the first and second large diameter portions having the same diameter and the same axial length.

5. A lens barrel according to claim 1,
 wherein the core portion comprises a large diameter portion provided at a center portion in an axial direction of the core portion, for preventing the core portion and the collar portion from slipping off in the axial direction, and
 wherein the core portion comprises first and second small diameter portions provided on both sides of the large diameter portion in the axial direction of the core portion, the first and second small diameter portions having the same diameter and the same axial length.

6. A lens barrel according to claim 1, wherein the collar portion has a radial thickness smaller than a radial thickness of the core portion.

7. A lens barrel according to claim 1, wherein a radial thickness of the collar portion falls within a range of 0.3 to 0.7 mm.

8. A lens barrel according to claim 1,
 wherein the barrel member comprises a first barrel member having a cam groove formed therein, and a second barrel member having a translation groove formed therein, and
 wherein the cam follower is fitted into an intersecting portion of the cam groove and the translation groove all at once, and one of the first barrel member and the second barrel member is driven to rotate so that the lens holding frame moves in an optical axis direction.

9. An optical apparatus, comprising the lens barrel according to claim 1.

* * * * *